United States Patent [19]

Kellis

[11] 4,237,405
[45] Dec. 2, 1980

[54] METHOD AND APPARATUS FOR CONSERVING ENERGY

[75] Inventor: James T. Kellis, Tustin, Calif.

[73] Assignee: Lear Siegler, Inc., Santa Monica, Calif.

[21] Appl. No.: 885,392

[22] Filed: Mar. 10, 1978

[51] Int. Cl.³ .................. G05F 1/00; H05B 37/02; H05B 39/04; H05B 41/36

[52] U.S. Cl. .................. 315/307; 315/310; 315/311; 315/DIG. 7; 307/234; 323/17; 323/19; 323/22 T; 363/23

[58] Field of Search .............. 315/307, 308, 310, 311, 315/DIG. 5, DIG. 7; 307/234; 363/23, 24, 27, 28, 73; 328/141, 146, 11; 323/17, 19, 22 T, 22 SC, 25

[56] References Cited

U.S. PATENT DOCUMENTS

| | | | |
|---|---|---|---|
| 3,648,106 | 3/1972 | Engel et al. | 315/307 |
| 3,890,562 | 6/1975 | West | 315/311 |
| 3,898,549 | 8/1975 | Mitchell | 363/24 |
| 3,946,302 | 3/1976 | Kovalick et al. | 323/19 |
| 3,959,716 | 5/1976 | Gilbert, Jr. et al. | 323/22 T |
| 3,967,159 | 6/1976 | Dendy et al. | 315/308 |
| 3,999,100 | 12/1976 | Dendy et al. | 315/308 |
| 4,004,187 | 1/1977 | Walker | 363/24 |
| 4,039,897 | 8/1977 | Dragoset | 315/307 |
| 4,042,856 | 8/1977 | Steigerwald | 315/307 |
| 4,076,974 | 2/1978 | Gee | 323/19 |
| 4,093,908 | 6/1978 | Evans | 323/19 |

Primary Examiner—Saxfield Chatmon, Jr.
Attorney, Agent, or Firm—Edward J. DaRin

[57] ABSTRACT

A method and apparatus for regulating the luminous flux generated by a lamp with the degeneration of the voltage from a power source such as a battery. The regulating circuit maintains a constant luminous flux output from a lamp over a substantial range of voltages by switching the voltage to the lamp on and off at a preselected and controlled duty cycle. The principal advantage of this regulation is that only the minimum energy necessary to produce a required minimum luminous flux is used from the power sources irrespective of its voltage value within the operative range. The power pulses applied to the lamp are of a voltage that varies directly as the voltage variations of the power source and widths that vary as the inverse square of the voltage from the power source for maintaining a constant RMS voltage on the lamp and thereby constant light output flux. The oscillating signal generator for providing the power pulses is defined for sensing the power source output voltage variations and generates a fixed frequency signal having amplitudes varying between values directly related to the power source output voltages.

11 Claims, 6 Drawing Figures

METHOD AND APPARATUS FOR CONSERVING ENERGY

REFERENCE TO RELATED APPLICATIONS

This application is an improvement over the copending application bearing Ser. No. 752,689 assigned to the same assignee as the present application now U.S. Pat. No. 4,156,166.

DISCLOSURE OF THE INVENTION

This invention relates to a method and apparatus for conserving the energy of a power source and more particularly to regulating circuits for maintaining constant the root mean square, RMS, voltage output of the regulating circuits despite variations in their supply voltage.

Barricade lights are commonly used on highways to warn motorists of hazardous conditions. They can be either flashing or steady-burn types of lights. The energy saving circuits disclosed herein have application to both types of barricade lights. These barricade lights commonly used Leclanche cell type batteries, which must be replaced as they become depleted, and incandescent lamps.

In order to provide good visibility in barricade flashers, it is necessary to produce a specified minimum of luminous intensity. As power is drained from the battery, its terminal voltage decreases causing lamp light output to diminish. In order to produce the minimum luminous intensity when battery voltage is low, it has been necessary to accept the fact that the lamp will produce much more than the minimum luminous intensity when the battery is fresh and its terminal voltage high, perhaps greater than one and one-half times the low value. If the effective voltage applied to the lamp could be maintained at the voltage value needed to produce the minimum intensity, as the terminal voltage decreases, the power that is wasted in producing an excess of light intensity would be used to extend the useful life of the battery. Since batteries are expensive and must be replaced frequently, a means of conserving energy or extending battery life, thereby decreasing the frequency of replacement, is economically rewarding.

Regulation of lamp voltage also extends lamp life. The regulation of a lamp extends the life of a lamp by eliminating the effects of the high initial voltage of a fresh battery.

A regulating circuit of the above-described type is disclosed in the aforementioned copending patent application bearing Ser. No. 752,689 wherein there is disclosed a method and apparatus for regulating the source potential to permit the constant output light level to be efficiently produced over a wide range of source voltage. The regulating circuit disclosed is said copending application is generally satisfactory and produces regulation within 7 percent of the desired voltage. The circuit disclosed in said copending application, however, requires a number of large components to be utilized and therefore cannot be readily and economically constructed by means of integrated circuit technology. In view of the number of large components required for implementing such a circuit, it becomes too expensive to construct the circuit in the form of an integrated circuit "chip" since the "chip" required is too large. Accordingly, there is a need at the present time for a regulating circuit of the above-mentioned type that will produce the desired regulation but that can be inexpensively constructed by means of integrated circuit techniques.

The present invention provides an improved, simplified and relatively inexpensive regulation circuit for maintaining the root mean square, RMS, voltage across the load constant over a substantial range of source voltages. When the load is a lamp that is battery powered, a constant light flux output is produced by maintaining a constant RMS voltage to the lamp over a substantial range of battery voltages thereby reducing the frequency of battery replacement. This improved regulator circuit can be readily and inexpensively constructed by integrated circuit techniques. The provision of such a regulator circuit also extends the life of the lamps that are regulated by eliminating the high initial voltage effects.

From a broad method and apparatus standpoint, the present invention provides a regulating circuit to maintain a consant effective, or RMS, voltage on the load by switchably applying power pulses to the load. The pulses are applied to the load so that the height of the pulse and the width of the pulse vary in accordance with the variations of the output voltages of the source voltage for maintaining a constant RMS voltage value on the load.

From a method standpoint the present invention comprehends a method of maintaining the light flux from a lamp substantially constant when the lamp is powered from a source that degenerates in output voltage with time. The method includes the steps of generating a constant voltage reference signal. A fixed frequency oscillating signal is generated by charging and discharging a capacitor between a pair of voltage values having a preselected fixed voltage ratio relative to the output voltages from the source. The two signals are sensed for determining their relative amplitudes for providing regulating pulses of widths having an inverse square relationship to the voltages from the source and then switchably applying the power source to a lamp to provide power pulses having a voltage height in accordance with the amplitude of the output voltages from the source and widths in accordance with the regulating pulses for maintaining a constant RMS voltage on the lamp.

The apparatus of the present invention for regulating and maintaining substantially constant the RMS voltage value of the load comprises a power source having a nominal output voltage exhibiting a decreasing output voltage with time. A load is adapted to be coupled to the power source to be energized therefrom and has a voltage rating corresponding to the lowest source voltage capable of sustaining a constant RMS voltage value. A source of reference potential adapted to be coupled to the power source provides a reference signal of a constant preselected voltage value. Capacitor means is adapted to be coupled to the power source to be charged therefrom. The apparatus includes means for generating a fixed frequency oscillating signal by charging and discharging the capacitor between a pair of voltage values each having a preselected voltage ratio relative to the output voltage from the power source. Comparing means is included for comparing the relative magnitudes of the reference signal and the oscillating signal for providing regulating pulses having an inverse square relationship to the output voltages from the power source and is utilized along with means for switchably applying the power source to the load in response to the regulating pulses for maintaining the substantially constant RMS voltages on the load.

These and other features of the present invention will be more fully appreciated when considered in the light of the following specification and drawings, in which.

Now the basic regulating concept of the present invention will be described in detail, with reference to the drawings as required.

To maintain the luminous flux output of a lamp constant, the average power applied to the lamp must necessarily also be constant. RMS, or "effective" voltage is by definition that which produces a particular power in a load to which it is applied irrespective of the voltage waveshape. The relation between average power and RMS voltage applied is $$P_{Avg} = E_{RMS}^2 / R_L \quad [1]$$

where $R_L$ is the resistance of the load. In the case wherein a repetitive train of pulses is applied to a load, the average power is given by $$P_{Avg} = \frac{V_L^2}{R_L} \times \frac{T_{ON}}{T_{ON} + T_{OFF}} \quad [2]$$

wherein $T_{ON}$ is the amount of time the load is powered and $T_{OFF}$ is the amount of time the load is not powered and wherein $V_L^2/R_L$ is the instantaneous power in the load having resistance $R_L$ and voltage $V_L$ applied and $$\frac{T_{ON}}{T_{ON} + T_{OFF}}$$

is the proportion of time or duty cycle over which power is applied. Combining [1] and [2], $$E_{RMS}^2 = V_L^2 \times \text{Duty Cycle} \quad [3]$$

Thus, it is apparent from [3] that for a given constant RMS voltage, $E_{RMS}$, duty cycle must have an inverse square relationship to the applied pulse voltage, $V_L$, or $$\text{Duty Cycle} = E_{RMS}^2 / V_L^2 \quad [4]$$

Electronic switches, such as the transistor switch described herein, are often imperfect in that they exhibit a voltage drop, $V_{ON}$, when conducting. To account for this effect, equation [4] may be modified to show the dependence of duty cycle when a voltage source, $V_B$, is applied to the load through such a switch, the ideal duty cycle relation is then $$\text{Duty Cycle}_{\text{Ideal}} = \frac{E_{RMS}^2}{(V_B - V_{ON})^2} \quad [5]$$

The actual value of duty cycle, by analysis of the circuit described herein, is $$\text{Duty Cycle}_{\text{Actual}} = \frac{T_R}{T_P}\left(1 - \frac{\ln\frac{\beta V_B}{V_T}}{\ln\frac{\beta}{\alpha}}\right) + \left(1 - \frac{T_R}{T_P}\right)\left(\frac{\ln\frac{1-\alpha}{1-V_T/V_B}}{\ln\frac{1-\alpha}{1-\beta}}\right) \quad [6]$$

Figure 5:
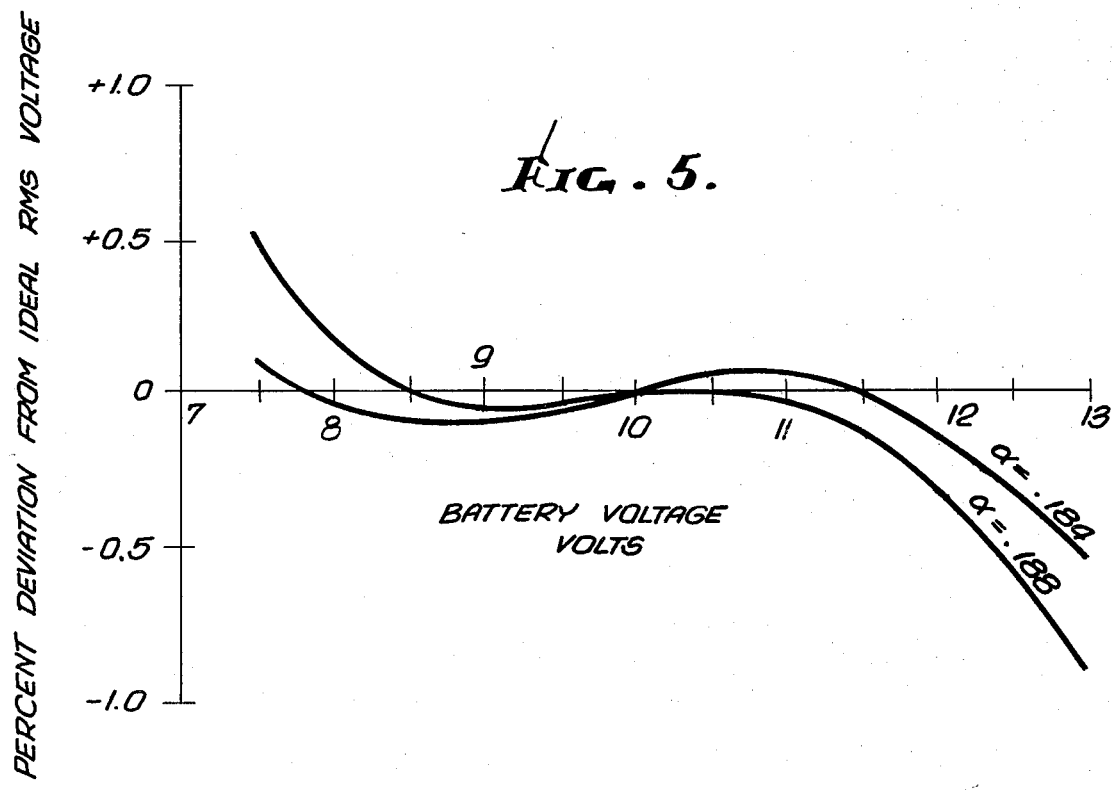
FIG. 5 is a graphical illustration of the percent deviation from ideal RMS voltage relative to actual RMS lamp voltage.

By optimal choice of the parameters in equation [6], it is possible to achieve actual values of duty cycle which closely approximate the ideal values calculated from equation [5], over the range of $V_B$ of interest. A plot of percent deviation from the ideal is shown in FIG. 5 over values of $V_B$ between 13 and 7.5 volts with an assumed $V_{ON}$ of 0.20 volts.

The optimal values of $\alpha$, $\beta$ and $V_T$ at $V_B$ at a minimum value of 7.5 volts has been determined to be $\alpha = 0.184$
$\beta = 0.66$
$V_T = 4.95$ volts
$T_R/T_P = 0.02$
$T_R$ = the discharge time of capacitor, seconds
$T_P$ = period of oscillation, seconds By alternative selections of these parameters, a family of regulation curves can be obtained. In some applications a non-constant regulation curve may be desirable. For instance, the evaporation of filament material and its deposition on the interior of the bulb, causes a "blackening" effect. This loss of transparency diminishes light output. A rising voltage curve as the lamp blackens can maintain a more uniform light output. FIG. 5 shows two curves at $\alpha = 0.184$ and $\alpha = 0.188$ and demonstrates that by suitable manipulation of parameters, regulating characteristic can be matched to the application.

Figure 1:
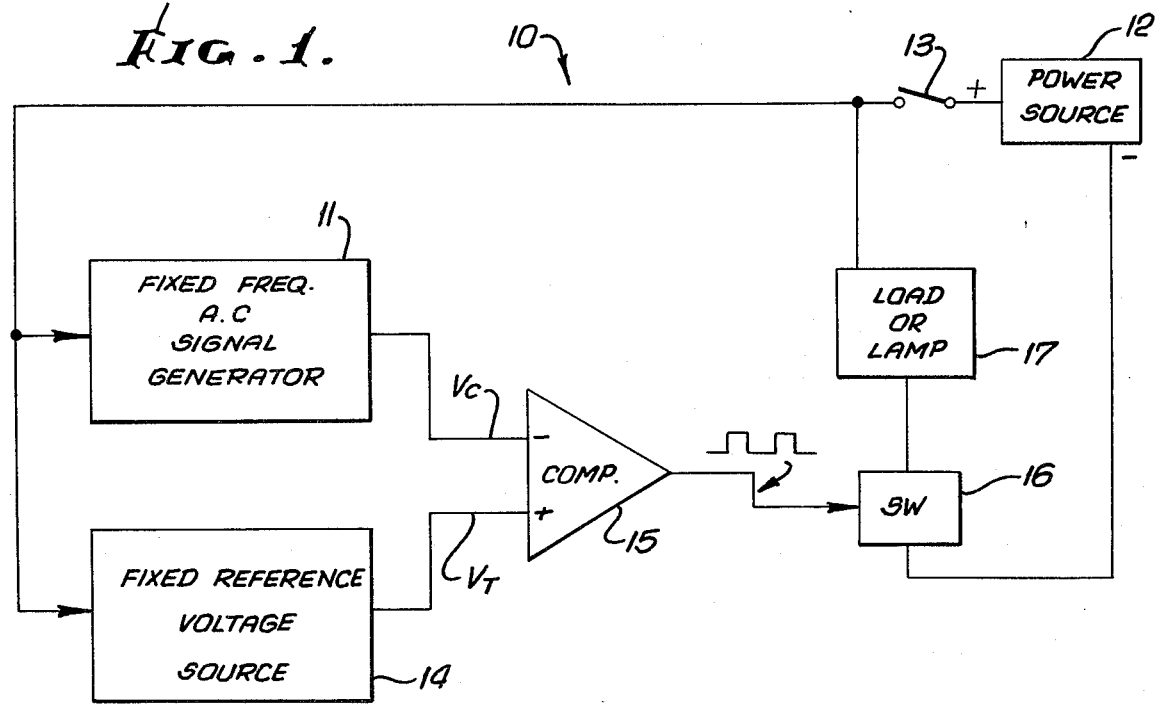
FIG. 1 is a general block diagram of the regulating circuit embodying the present invention.
Figure 3:
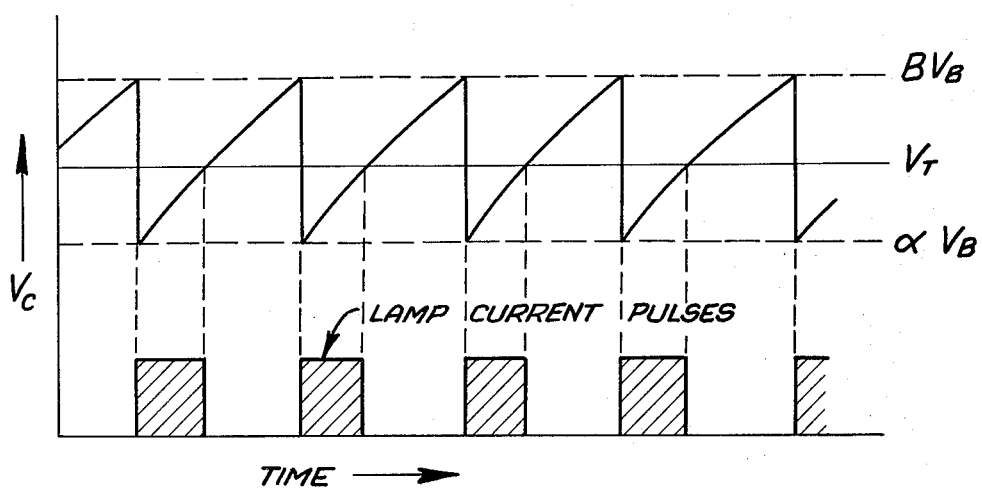
FIG. 3 is a graphical illustration of the relative magnitudes of the voltages of the oscillator signal and the reference signal and their relationship with the regulating pulses.

Now referring to FIG. 1, the general organization of the regulator circuit 10 comprising the present invention will be examined. The regulator 10 includes a fixed frequency alternating current signal generator 11 adapted to be coupled to the DC power source 12 through the manually operated switch 13. The signal generator 11 is illustrated as being coupled to the positive terminal of the DC power source 12. The fixed frequency signal generator 11 senses the voltage from the source 12 and provides the oscillating signal having a fixed frequency and with amplitudes varying in accordance with the variations in the output voltages of the power source 12. A typical waveform provided by such a fixed frequency signal generally is illustrated in FIG. 3 and identified as the waveform $V_C$.

The regulator 10 also includes a fixed reference voltage source 14 adapted to be coupled to the power source 12 through the switch 13. The reference voltage source 14 provides an output signal $V_T$ having a preselected, constant voltage amplitude that is independent of the output voltage of the source 12. The output signals from the signal generator 11 and the fixed reference voltage source 14 are applied as individual input signals to a comparator 15. The signal $V_T$ from the voltage source 14 is applied to the positive input terminal of the comparator 15 and the output signal $V_C$ from the signal generator 11 is applied to the negative input terminal of the comparator 15. The comparator 15 functions to determine the relative magnitudes of the two input signals and when the amplitude of the oscillating signal $V_C$ applied to the negative input terminal of the comparator 15 exceeds the amplitude of the signal $v_T$ applied to the positive input terminal of the comparator, a low output signal will be provided from the comparator 15. Alternatively, when the $V_C$ signal is less in amplitude than the $V_T$ signal, the output from the comparator 15 is at a high voltage level. The output signals from the comparator 15 are applied to a switching circuit 16 arranged in series circuit relationship with the load or lamp element 17, as illustrated. The load or lamp 17 is coupled directly to the positive terminal of the power source 12 though the switch 13.

The circuit organization illustrated in FIG. 1 is such that for low output signals from the comparator 15, switching circuit 16 is nonconductive and the load or lamp 17 is in a nonconducting condition. When the power switch 13 is closed, the output from the comparator 15 is at a high potential level so as to maintain the switch 16 in a conductive condition. This will cause the load or lamp 17 to be in a conducting condition. After this initial time interval, the $V_C$ signal from the signal generator 11 goes through a positive excursion and when it reaches an amplitude that slightly exceeds the amplitude of the signal $V_T$ applied to the positive input of the comparator 15, the output from the comparator will drop to a low voltage level. This low level output signal from the comparator 15 will render the switch 16 nonconductive and cause the load or lamp 17 to become deenergized. This condition will prevail until the amplitude of the signal $V_C$ from the AC signal generator 11 again falls below the level of the fixed reference voltage source 14 signal $V_T$. At this time the output from the comparator 15 will revert to its high voltage level and the switch 16 will be rendered conductive and the load or lamp 17 will accordingly be rendered conducting. The duration of time that the switch 16 is rendered conductive and the load 17 is conducting is governed directly by the time interval that the voltage signal $V_C$ from the generator 11 is less than the voltage $V_T$ from the source 14. These voltage relationships are clearly illustrated in FIG. 3 along with the corresponding power pulses applied to the load 17 as a result of the switch 16 being rendered conductive. The width of the power pulses are determined by the time interval the signal $V_C$ is below the line $V_T$.

Figure 2:
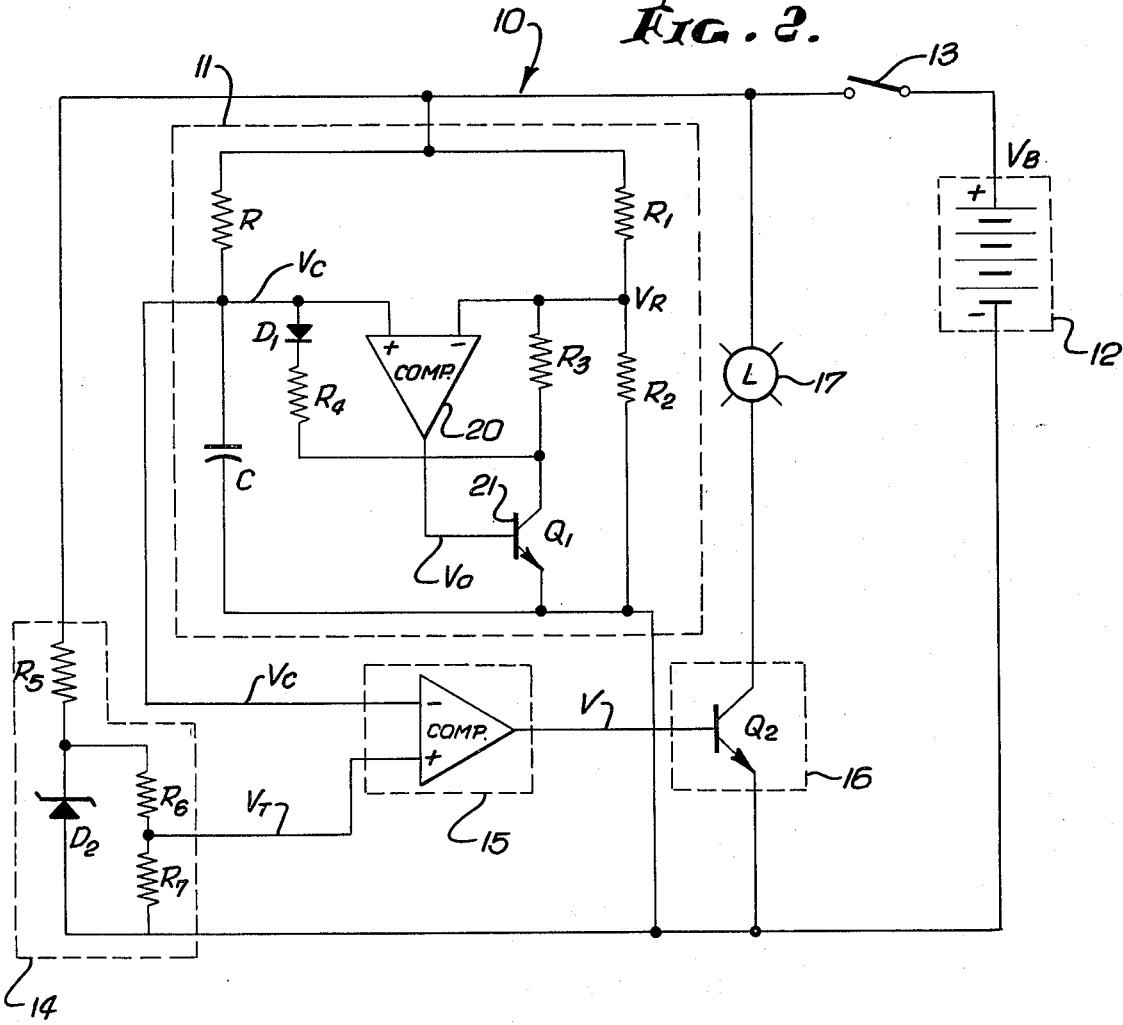
FIG. 2 is a schematic circuit diagram of the regulating circuit represented in FIG. 1.

Now referring to Fig. 2, the detailed circuit organization of the regulator 10 will be examined. The fixed frequency AC signal generator 11 illustrated in FIG. 2 comprises a circuit organization for charging and discharging a capacitor in a controlled manner to generate a voltage $V_C$ for producing the desired regulating action on the lamp 17. The signal generator 11 as illustrated comprises a resistance-capacitance circuit coupled across the power source 12 for causing the capacitor to be charged therefrom. The resistive element in this circuit is illustrated as the resistor R arranged in series circuit with the capacitor C to allow the capacitor C to be charged from the source 12 through the resistor R in a conventional fashion. The voltage developed across the capacitor C or the voltage signal appearing at the common junction of R and C is identified as the $V_C$ signal and is applied to the positive input terminal of a comparator 20. A voltage dividing network comprising a resistor R1 and a resistor R2 is arranged in series circuit relationship across the power source 12. One terminal of the resistor R1 is coupled directly to the positive terminal of the power source 12 through the manually operated power switch 13. The potential developed at the junction between the resistor R1 and R2 is identified as a reference potential $V_R$. The opposite end of the resistor R2 is coupled directly to the negative terminal of the voltage source 12. The reference potential $V_R$ is coupled to the negative input terminal of the comparator 20. The output signal from the comparator 20 is identified as a signal $V_O$.

The voltage dividing network including the resistors R1 and R2 also includes a parallel branch comprising the resistor R3 and a switching transistor Q1 further identified as the transistor 21. One terminal of the resistor R3 is coupled in common with the reference point $V_R$. The other terminal of the resistor R3 is coupled directly to the collector electrode for transistor 21. The emitter electrode for the transistor 21 is coupled to the negative battery terminal, as illustrated. The base electrode for the transistor 21 is coupled directly to receive the output signal from the comparator 20 or the signal $V_O$. The circuit arrangement is such that the transistor 21 is in a nonconductive condition for low values of signal $V_O$.

The voltage dividing network described hereinabove coacts with a circuit path for discharging the capacitor C. This circuit path includes a diode D1 having its anode electrode coupled directly to the point $V_C$ and a resistor R4 arranged in series circuit relationship. One terminal of the resistor R4 is coupled to the cathode electrode of the diode $D_1$ while its other terminal is coupled directly to the collector electrode for the transistor 21.

The fixed reference voltage source 14 illustrated in FIG. 2 comprises a dropping resistor R5 coupled directly to the positive terminal of the source 12 through the switch 13. The other terminal of the dropping resistor R5 is coupled to the cathode electrode of a Zener diode D2 and the Zener diode has its other electrode coupled to the negative terminal of the source 12. A pair of voltage dividing resistors identified as the resistors R6 and R7 are coupled between the negative terminal of the source 12 and the junction between the resistor R5 and the Zener diode D2. Under proper circuit operation, the Zener diode D2 maintains a constant potential at the junction to which the resistor R6 is coupled. Accordingly, the voltage across the combination of the resistors R6 and R7 is constant for the voltage range over which the regulator circuit 10 is effective. A reference potential identified as the signal $V_T$ is derived from the source 14 at the junction between the resistor R6 and R7. The signal $V_T$ from the source 14 is applied as the input signal to the positive terminal of the comparator 15. The input signal to the negative terminal of the comparator 15 is derived from the voltage appearing across the capacitor C or the signal $V_C$. The output signal from the comparator 15 is applied to a switching circuit 16 further identified as a transistor Q2. The output signal from comparator 15 is applied directly to the base electrode of the transistor Q2. The emitter electrode of the transistor Q2 is coupled directly to the negative terminal of the source 12. The collector electrode of the transistor Q2 is coupled directly to the load which is illustrated as a lamp 17. The other terminal of the lamp 17 is coupled to the positive terminal of the source 12.

It should be understood that the operation of the regulating circuit 10 described hereinabove depends particularly on the operation of the fixed frequency AC signal generator 11. The oscillator 11 is particularly constructed and defined to provide an output signal of a fixed frequency and representative of the output voltages from the source 12. This output signal has amplitudes that vary between two reference potential values that are defined as fixed percentages of the source voltage $V_B$. These reference potentials are illustrated in FIG. 3 and are identified as the reference potentials $\beta V_B$ and $\alpha V_B$. The oscillating signal is generated between these reference potentials by causing the voltage on the capacitor C to rise and fall between these reference potentials in a fixed time interval regardless of the actual value of the voltage derived from the source $V_B$ so as to cause the frequency of oscillation to be constant.

The above described oscillating concept will be better appreciated when the actual operation of the circuit organization comprising the AC signal generator 11 is examined. The operation is as follows. When the switch 13 is operated to apply the source 12 to the regulator 10, it is assumed that the voltage stored in the capacitor C is zero. After the switch 13 is closed, the capacitor C will charge through the resistor R toward the terminal voltage $V_B$ of the source 12. The voltage across the capacitor C will rise in an exponential fashion. While the capacitor C is charging toward the source voltage $V_B$ the signals applied to the comparator 20 are such that the signal at the negative input terminal is of a higher value and maintains the output from the comparator 20 at a low output thereby maintaining the transistor 21 nonconductive. When the transistor 21 is nonconductive, the signal from the voltage dividing network is the potential developed at the junction between the resistors R1 and R2 or the signal $V_R$. When the voltage on the capacitor C rises to a value that it slightly exceeds the amplitude of the signal $V_R$ the output from the comparator 20 immediately goes to a high value. At this time the signal $V_O$ will render the switching transistor 21 conductive. When the switching transistor 21 is conductive, the voltage dividing network is altered due to the inclusion of the parallel branch including the resistor R3. In view of the parallel relationship of the resistor R2 with the branch including the resistor R3, the total resistance across the source 12 will be lowered and the potential of the signal $V_R$ will fall to a lower voltage level. When the transistor 21 is rendered conductive, it also provides a discharge path for the capacitor C. During the time that the transistor 21 is rendered conductive, the capacitor C will discharge through the diode D1, resistor R4 and the transistor 21 to cause the voltage on the capacitor C to decay in an approximately exponential fashion. The voltage on the capacitor C will discharge until it has reached a voltage level that is slightly below the new value of the reference voltage $V_R$ or the lower voltage level. When this occurs, the output signal $V_O$ from the comparator will again go to a lower voltage level and thereby render the transistor 21 nonconductive. When the transistor 21 is rendered nonconductive, the parallel resistance branch including the resistor R3 will be out of circuit with the voltage dividing network comprising R1 and R2 and the reference potential $V_R$ will revert to its initial value or its high value. After this occurs, the capacitor C will no longer discharge but will charge once again toward the voltage $V_B$ provided by the source 12 in an exponential fashion. The capacitor C will continue to charge until it again exceeds the amplitude of the reference potential $V_R$. This will switch the level of the output signal $V_O$ from the comparator 20 and the cycle then will repeat.

It is important to note in this operation that the voltage on the capacitor C tends to rise toward the output voltage from the source 12 and will rise to a voltage level that only slightly exceeds the amplitude of the voltage of the reference signal $V_R$. It will also decay to a value slightly below the value of the lower value for the reference signal $V_R$. From a mathematical approach, the capacitor C will charge and discharge between the reference voltages $\beta V_B$ and $\alpha V_B$ at a rate proportional to $V_B$. These values are defined as follows:

$$V_R \text{ (higher)} = \beta V_B \qquad [7]$$
$$\text{where } \beta = \frac{R_1}{R_2}$$
$$V_R \text{ (lower)} = \alpha V_B \qquad [8]$$
$$\text{where } \alpha = \frac{R_2 R_3}{R_1 R_2 + R_1 R_3 + R_2 R_3}$$

It should be noted that these reference voltages are fixed percentages of battery voltage $V_B$. Since $V_C$ rises and falls between $\alpha V_B$ and $\beta V_B$ at rates proportional to $V_B$, the transitions are accomplished in fixed time intervals regardless of the value of the $V_B$. Therefore, the frequency of oscillation is constant.

With the above operation of the signal generator 11 clearly in mind, the operation of the regulator circuit 10 can be better examined. The output signal from the generator 11 is applied as the $V_C$ signal to the comparator 15 at its negative input terminal. The signal $V_T$ from the reference voltage source 14 is applied to the positive terminal of the comparator 15. When the signal $V_C$ is less than the value of the signal $V_T$ the output from the comparator 15 is at a high voltage level and the switching circuit 16 is maintained in a conductive condition. When the switch 16 is in a conductive condition the lamp 17 is correspondingly conducting, as illustrated in FIG. 3. When the signal $V_C$ from the oscillator 11 is greater in amplitude than the signal $V_T$, the output from the comparator 15 will switch to a low voltage value and render the transistor Q2 nonconductive. When the switching circuit 16 or the transistor Q2 is rendered nonconductive, the lamp 17 is also rendered nonconducting therewith. As illustrated in FIG. 3, the time interval over which lamp 17 is conducting, is represented by the time that the signal $V_C$ is below the line $V_T$. During this interval a voltage pulse is applied to the lamp 17 of an amplitude that is essentially the value of the voltage from the source 12.

A qualitative aspect of the regulation characteristic of circuits 10 is that as the source 12 degenerates or as the battery ages, the initial value of the source output voltage $V_B$ decreases thereby lowering the values of $\beta V_B$ and $\alpha V_B$. When these reference values are decreased, the time interval that the signal $V_C$ is more negative than the signal $V_T$ will be greater and the time duration that the switch 16 is rendered conductive will be increased whereby the widths of the pulses applied to the lamp 17 will be increased. Thus, decreased source voltages are applied to lamp 17 for longer intervals to maintain a constant RMS value.

The maintenance of the constant RMS value on the load or lamp from a DC source, such as a battery that decays with time, in accordance with the present invention is over a substantial range of voltages from the initial voltage or fresh battery voltage to some preselected lower voltage. When a lamp is the load and it is desired to maintain the flux output of the lamp constant, it is necessary to maintain a constant RMS voltage on the lamp over a range of voltages as the voltage decreases. The lowest source or battery voltage that can sustain a constant RMS voltage is considered to be the "end of life" voltage. In the case of a lamp, the voltage rating of the lamp should be selected to have the "end of life" voltage.

Figure 4:
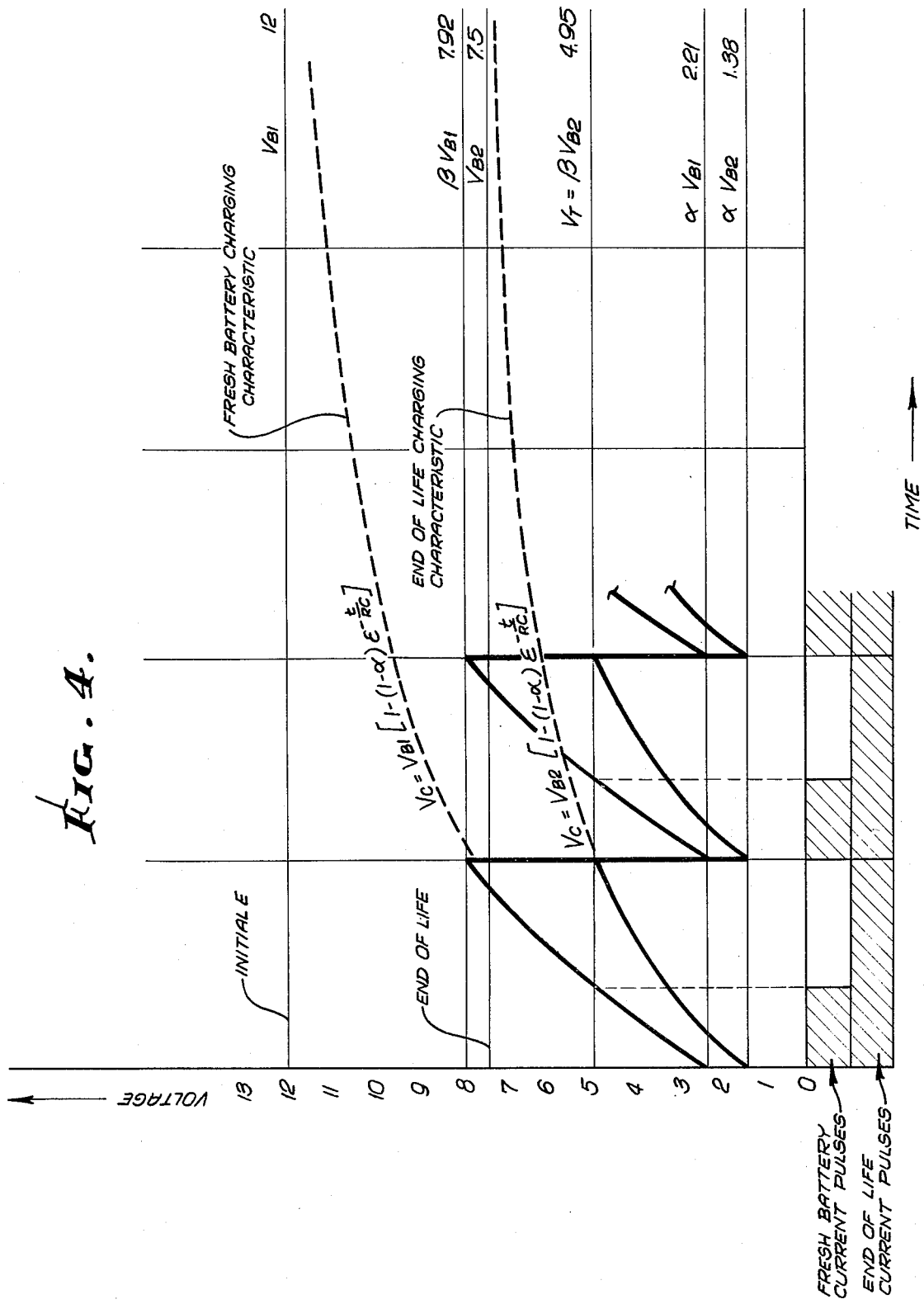
FIG. 4 is a graphical illustration of the capacitor charging curves for an initial terminal voltage of the power source and the end-of-life voltage of the power source along with the illustration of the relative widths of the regulating pulses for each charging curve.

FIG. 4 illustrates a pair of curves that correspond to the charging of the capacitor C when the terminal voltage of the source 12 of the signal $V_B$ is at its new or fresh battery voltage and the "end of life" voltage. As illustrated in FIG. 4, the initial terminal voltage from the source 12 is 12 volts with the "end of life" voltage identified as 7.5 volts. It will be recognized that a family of curves between these limiting values will be generated as the source 12 degenerates from the 12 volt level to the 7.5 volt level. The initial terminal voltage is identified in FIG. 4 as $V_{B1}$ and the "end of life" voltage as $V_{B2}$. The reference voltages utilized for controlling the signal generator 11 are similarly identified as ranging between the values $\beta V_{B1}-\alpha V_{B1}$ and $\beta V_{B2}-\alpha V_{B2}$. FIG. 4 also illustrates the duty cycle or the percentage of time that the lamp is energized relative to these two terminal voltages. To this end, it will be seen from examining FIG. 4 that the "end of life" charging curve is identified along with the equation $V_C = V_{B2}[1-(1-\alpha)\epsilon^{-t/RC}]$. This charging curve intersects the straight line representative of $\beta V_{B2}$ at approximately 5 volts. This corresponds to essentially 100 percent energization time for the lamp. The similar relationship for the fresh battery charging curve is illustrated relative to $\beta V_{B1} = 7.92$ volts and the corresponding time intervals of approximately 40 percent that the lamp is energized.

In a practical application of the invention utilizing a 12 volt battery, when the power switch is closed, the application of 12 volts to the lamp causes an inrush of current of near two amperes. In steady-burn type lamps this quickly stabilizes to a peak value of approximately 120 milliamperes provided that the pulse repetition rate is high so that the filament does not heat up or cool down between pulses. At a 2 kilohertz rate, the period between pulses is less than 0.5 milliseconds. Since the thermal lag of the filament is about 25 milliseconds, the filament resistance stabilizes at approximately 100 ohms and the filament temperature is practically constant. In a flashing lamp, at 56 flashes per minute, the filament cools down between flashes, so that an inrush of near 600 milliamperes occurs at the start of the flash. After the first few milliseconds of the flash period, the filament resistance stabilizes at 100 ohms, and the peak current at 120 milliamperes. It is important that the period between pulses be short compared to the thermal lag of the filament to avoid filament temperature and resistance variations, from pulse to pulse, which would waste battery energy and decrease lamp life.

Figure 6:
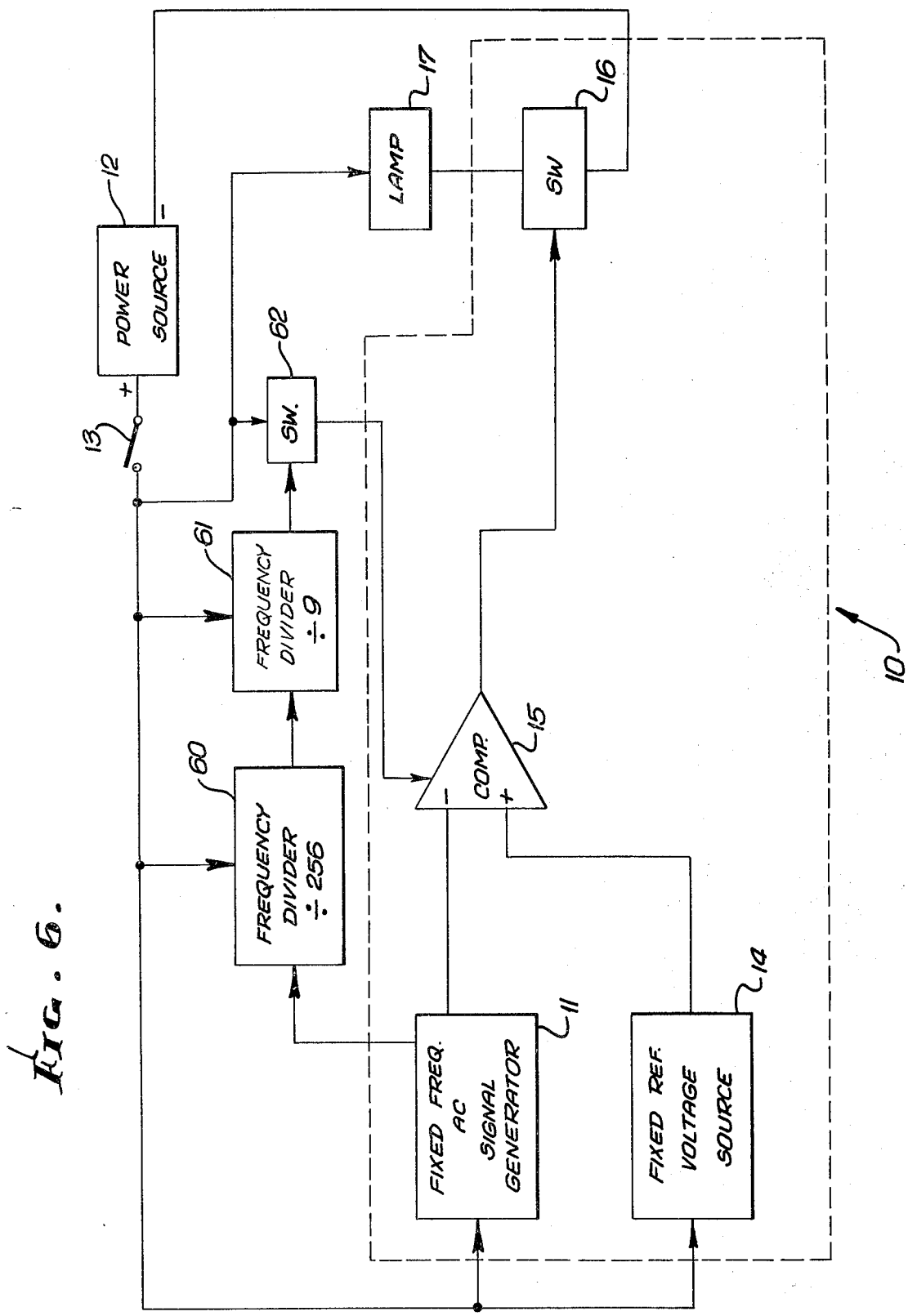
FIG. 6 is a block diagram of a flashing type barricade light including the regulating circuit of FIGS. 1 and 2 therein.

Now referring to FIG. 6 wherein the regulator 10 is illustrated as including a timing circuit for controlling the lamp 17 to flash at preselected intervals. For this purpose the comparator 20 included within the AC signal generator 11 has its output signal coupled to a frequency dividing network. The frequency dividing network comprises a frequency divider 60 having a division ratio of 256 coupled to a second frequency divider 61 having a division of 9. The output of the divider 61 is coupled to a power switch 62 for energizing the comparator 15 of the regulating circuit 10. If the AC signal from the generator 11 is set at 2150 Hertz, the output of the divider 61 is that frequency divided by 256 and 9 which is 0.933 Hertz or 56 cycles per minute. The divider 61 is arranged to provide output signals which are of a duration equal to 1/9 its cycle time, or 0.119 seconds for the 0.933 Hertz output rate. The regulating circuit 10 will be operative when the comparator 15 is energized through the switch 62. Thus, the regulated luminous output flashes of lamp 17 will occur at a rate of 56 per minute and each have a duration of 0.119 seconds.

What is claimed is:

1. Apparatus for regulating the light output of an electrical lamp comprising a power source having a nominal output voltage $V_B$ exhibiting a decreasing output voltage with time, a lamp adapted to be coupled to the source to be energized and de-energized therefrom, the lamp having a voltage rating substantially equivalent to a preselected voltage level lower than said $V_B$ voltage level, a source of reference potential adapted to be coupled to the power source for providing a first reference potential $V_T$ of substantially constant amplitude when energized therefrom, means for generating an oscillating signal having a preselected wave shape and a fixed frequency, said means comprising voltage storage means coupled in parallel circuit relationship with said power source to be charged from said source and second reference voltage means coupled in parallel circuit relationship with said source for providing a pair of reference voltage signals $\beta V_B$ and $\alpha V_B$ wherein $\alpha$ and $\beta$ are fixed percentages of the power source output voltages and $V_B$ is representative of the power source output voltages and $\beta$ is a value a preselected amount higher than $\alpha$, said oscillating signal generating means comprising first means for sensing the relative amplitudes of the voltage stored on said voltage storage means and said reference voltages $\beta V_B$ and $\alpha V_B$ for switching the second reference voltage means to said $\alpha V_B$ potential when the voltage storage means exceeds the amplitude of said $\beta V_B$ reference potential and for discharging the voltage stored in said voltage storage means and for sensing when the amplitude of the voltage stored in said voltage storage means has discharged to a value that is lower than said $\alpha V_B$ reference potential for switching the reference voltage means to said $\beta V_B$ reference potential and for charging the voltage storage means to thereby sequentially charge and discharge the voltage storage means between $\beta V_B$ and $\alpha V_B$ in a fixed time interval, regardless of the actual value of $V_B$ to thereby obtain an oscillating signal of a fixed frequency, and second means for sensing the relative amplitudes of said first reference potential $V_T$ and said oscillating signal for providing pulses having pulse widths that vary in an inverse square relationship with the source voltages $V_B$, and switching means coupled between the lamp and the power source and coupled to responsive to the output pulses from said second means for switching the power source to the lamp on and off at a preselected rate, the pulses having heights varying with the output voltages from said source.

2. Apparatus for regulating the light output of an electrical lamp as defined in claim 1 including means coupled between the power source and said regulating means for causing the lamp to be energized and de-energized for preselected time intervals and to render the regulating means operative during the time intervals the lamp is energized.

3. Apparatus for regulating the light output of an electrical lamp as defined in claim 1 wherein said switching means is adapted for maintaining a substantially constant value of RMS voltage across the lamp and provides power pulses at approximately 2 kilohertz.

4. Apparatus for regulating the light output of an electrical lamp as defined in claim 3 wherein the regulation of the RMS voltage value is within one percent.

5. Apparatus for regulating and maintaining substantially constant the RMS voltage value on a load comprising a power source having a nominal output voltage $V_B$ exhibiting a decreasing output voltage with time, a load adapted to be coupled to the power source to be energized therefrom, the load having a voltage rating corresponding to the lowest source voltage capable of sustaining the constant RMS voltage value, a source of reference potential adapted to be coupled to the power source for providing a reference signal of constant preselected value, capacitor means adapted to be coupled to said source to be charged therefrom, means coupled to said capacitor means for generating a fixed frequency oscillating signal having an amplitude representative of the output voltages from said source by charging and discharging said capacitor between a pair of voltage values each having a preselected, fixed voltage ratio relative to the decreasing output voltages from said source, said means being adapted to be coupled to said source to be powered therefrom, means for comparing the relative magnitudes of the reference signal and the oscillating signal for providing regulating pulses having an inverse square relationship to the output voltages from said source, and means coupled to the load and to the power source for switchably applying said power source to the load in response to said regulating pulses rendering said switching means conductive for maintaining a substantially constant RMS voltage on the load.

6. Apparatus for regulating and maintaining substantially constant the RMS voltage value on a load as defined in claim 5 wherein said load is a lamp and said switching means couples the power pulses to the lamp at a 2 kilohertz rate.

7. Apparatus for regulating and maintaining substantially constant the RMS voltage value on a load as defined in claim 5 wherein said load is a lamp and said switching means couples the power pulses to the lamp at a rate so that the period between pulses is short relative to the thermal lag of the lamp filament for avoiding filament temperature and resistance variations.

8. Apparatus for regulating and maintaining substantially constant the RMS voltage value on a load as defined in claim 5 including timing circuit means for controlling the time intervals that the lamp is energized and deenergized to cause the lamp to flash on and off at a preselected rate and flash period.

9. A method of maintaining the RMS voltage value applied to a load substantially constant when the voltage source degenerates with time including the steps of providing a DC voltage source $V_B$ having a decreasing output voltage with time, generating an alternating current signal having a fixed frequency and powered from said DC voltage source by charging and discharging a capacitor between preselected voltage levels each having a preselected voltage ratio to the output voltages from said source, said voltage levels being $\beta V_B$ and $\alpha V_B$ wherein $\alpha$ and $\beta$ are fixed percentages of the power source output voltages and $\beta$ is a value higher than $\alpha$.

generating a constant reference voltage powered from said DC voltage source, comparing the relative amplitudes of the reference voltage and the alternating current signal for providing output regulating pulses only during the time that the capacitor voltage exceeds the reference voltage, and switchably applying the voltage source to a load in response to the regulating pulses for controlling the RMS voltage value to the load, the pulses applied to the load having a height directly related to the output voltage from said source and the widths of the regulating pulses having an inverse square relationship to the output voltage from said source.

10. A method of maintaining the RMS voltage value applied to a load substantially constant as defined in claim 9 wherein the load comprises a lamp having a voltage rating corresponding to the lowest voltage of the DC voltage source capable of sustaining a constant RMS voltage value on the lamp.

11. Apparatus for regulating the RMS voltage values applied to a load comprising a power source having a nominal output voltage $V_B$ exhibiting a decreasing output voltage with time, a load adapted to be coupled to the source to be energized therefrom, the load having a voltage rating substantially equivalent to a preselected voltage level lower than said $V_B$ voltage level, a source of reference potential adapted to be coupled to the power source for providing a reference signal $V_T$ of constant amplitude, a series resistance-capacitance network coupled across the power source for permitting the capacitor to be charged from said source through the resistor, comparison circuit means having a pair of input circuits, one of the input circuits being coupled to a common junction between the series resistance-capacitance network to be responsive to the voltages stored on the capacitor, a voltage dividing network having a preselected voltage reference point coupled across the power source, said voltage dividing network including switching circuit means coupled thereto for conductively varying the voltage relationships of the network and thereby varying the voltages appearing at the voltage reference point, the other input circuit of the comparison circuit means being coupled to the preselected voltage reference point in said dividing network to be responsive to the voltages developed at said point, the output signals produced from the comparison circuit means being coupled to said switching circuit means and proportioned for rendering the switching circuit conductive when the capacitor voltage exceeds said reference voltage and is rendered nonconductive when the reference voltage exceeds the capacitor voltage, unilateral circuit means coupled between said common junction between the series resistance-capacitance network and said dividing network switching circuit means for providing a discharge path for the capacitor through the switching circuit means during the time intervals said switching circuit is rendered conductive in response to said output signals from the comparison circuit means and to permit the capacitor to be charged when said switching circuit means is rendered nonconductive, means for sensing the relative magnitudes of said constant reference signal $V_T$ and the voltages developed across the capacitor for providing power pulses having a pulse width of inverse square relationship to said source voltages $V_B$ for application to said load when the capacitor voltages are less than said reference voltages $V_T$, and another switching circuit means coupled between said load and to the power source for controlling the energization of the load and coupled to said last mentioned means to be rendered conductive in response to said power pulses to thereby provide a constant RMS voltage value on the load.

* * * * *

UNITED STATES PATENT OFFICE
CERTIFICATE OF CORRECTION

Patent No. 4237405                  Dated December 2, 1980

Inventor(s) James T. Kellis

It is certified that error appears in the above-identified patent and that said Letters Patent are hereby corrected as shown below:

Col. 2, line 19, change "consant" to -- constant --.

Col. 9, line 13, after "voltage" insert -- value --.

Col. 11, line 2, after "to", add -- be --.

Signed and Sealed this

*Seventh* Day of *July 1981*

[SEAL]

*Attest:*

RENE D. TEGTMEYER

*Attesting Officer*     *Acting Commissioner of Patents and Trademarks*